United States Patent [19]

Fujino et al.

[11] Patent Number: 4,611,371

[45] Date of Patent: Sep. 16, 1986

[54] METHOD FOR MANUFACTURING AN EYEGLASS-FRAME

[75] Inventors: Yoshihiro Fujino; Kazuo Kurahashi, both of Hamamatsu, Japan

[73] Assignee: Nippon Gakki Seizo Kabushiki Kaisha, Japan

[21] Appl. No.: 411,103

[22] Filed: Aug. 24, 1982

[30] Foreign Application Priority Data

Aug. 26, 1981 [JP] Japan ................. 56-133606

[51] Int. Cl.[4] .................. B21D 33/00; B22C 9/02
[52] U.S. Cl. ................................. 29/20; 164/34; 164/35
[58] Field of Search ............. 164/34, 35; 29/20

[56] References Cited

U.S. PATENT DOCUMENTS 3,305,358  2/1967  Lirones .................. 164/34
4,254,544  3/1981  Barker ................... 164/34

Primary Examiner—Howard N. Goldberg
Assistant Examiner—Steven Nichols
Attorney, Agent, or Firm—Ostrolenk, Faber, Gerb & Soffen

[57] ABSTRACT

As a substitute for brazing conventionally employed for attaching curved pad holders to rims of an eyeglass-frame, casting is used for formation of an eyeglass-frame including, in one body with its rims, straight pad holders which should thereafter be bend to a required configuration. Conventional troubles arising from use of brazing are fully removed.

4 Claims, 4 Drawing Figures

METHOD FOR MANUFACTURING AN EYEGLASS-FRAME

BACKGROUND OF THE INVENTION

The present invention relates to improved method for manufacturing an eyeglass-frame, and more particularly relates to an improvement in manufacturing of a metallic eyeglass-frame by casting.

A metallic eyeglass-frame generally includes a pair of rims each holding a lens, an upper and a lower bridge for connecting the rims, a pair of lugs or decorations projecting sideways from the associated rims, a pair of pads or cringles attached to the facing edges of the rims below the bridges, and a pair of bows or sides extending rearwardly from the associated lugs. The pads are made of synthetic resin and adapted to rest on the nose of the wearer in order to hold the eyeglasses in position on the wearers face. Each pad is coupled to the associated metallic rim by means of a curved, linear pad holder extending from the edge of the rim and a pad core attached to the distal end of the pad holder.

In the conventional process for manufacturing eyeglass frames, in particular the pad holder, a thin metallic wire obtained by drawing a thick metallic rod is subjected first to rolling in order to have a required cross sectional profile and dimension, and next bending the rod in order to have a configuration adapted for a pad holder which is then attached to the edge of the associated rim by brazing.

Such a conventional process includes many operational steps and the brazing operation requires highly skilled technique. In addition, since an eyeglass-frame, in particular its part around the pads are always located quite close to the wearer's face, the pads and their related parts are placed under a condition considerably subject to corrosion by sweat. As is well known, brazing material are in general very vulnerable to corrosion of this sort. Thus, development in corrosion is lialbe to cause accidental separation of the pad holder with the pad from the associated rim.

Use of silver for the brazing material may somewhat alleviate such corrosion problems but not completely. In addition, use of such an expensive brazing material naturally is costly.

Further, the use of drawing and rolling operations in the conventional process places undesirable restriction on designing of eyeglass-frames. For example, the formation of a pad holder having a varying diameter along its length necessitates highly complicated operational steps which naturally add to the cost of the glasses.

SUMMARY OF THE INVENTION

It is one object of the present invention to fortify eyeglass-frames against sweat corrosion in an inexpensive manner.

It is another object of the present invention to allow free designing of eyeglass-frames, in particular their pad holders, in an inexpensive manner.

In accordance with the basic aspect of the present invention, a straight pad holder of an eyeglass frame is formed monolithically with an associated rim by metal casting and thereafter bent into a required configuration by plastic deformation.

DESCRIPTION OF THE PREFERRED EMBODIMENTS

Figure 1:
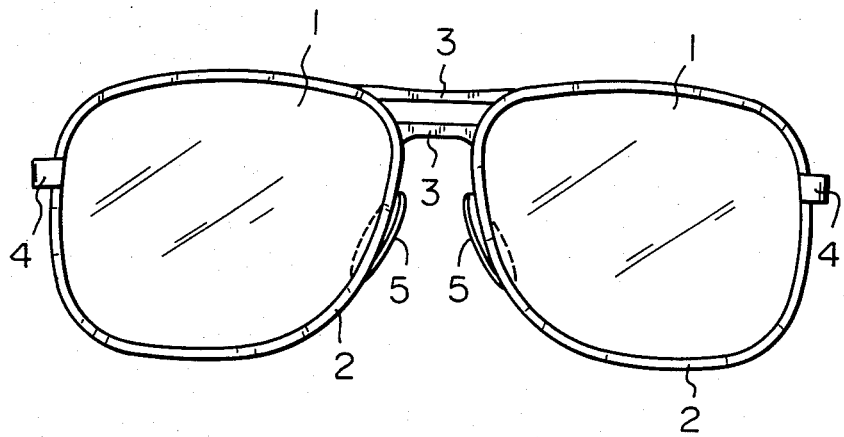
FIG. 1 is a front view of one example of a metallic eyeglass-frame.

One example of a metallic eyeglass-frame is shown in FIG. 1, in which a pair of rims 2 holding respective lenses 1 are connected to one another by means of a pair of bridges 3, lugs 4 are attached to the outer edges of the rims 2, bows (not shown) are connected to the lugs 4 via hinge joints (not shown), and synthetic resin pads 5 to rest on wearers nose are attached to facing edges of the rims 2.

Conventionally, pads 5 are attached, via pad cores 7, to the distal ends of thin, curved pad holders 6 extending from the facing edges of the associated rims 2.

Figure 4:
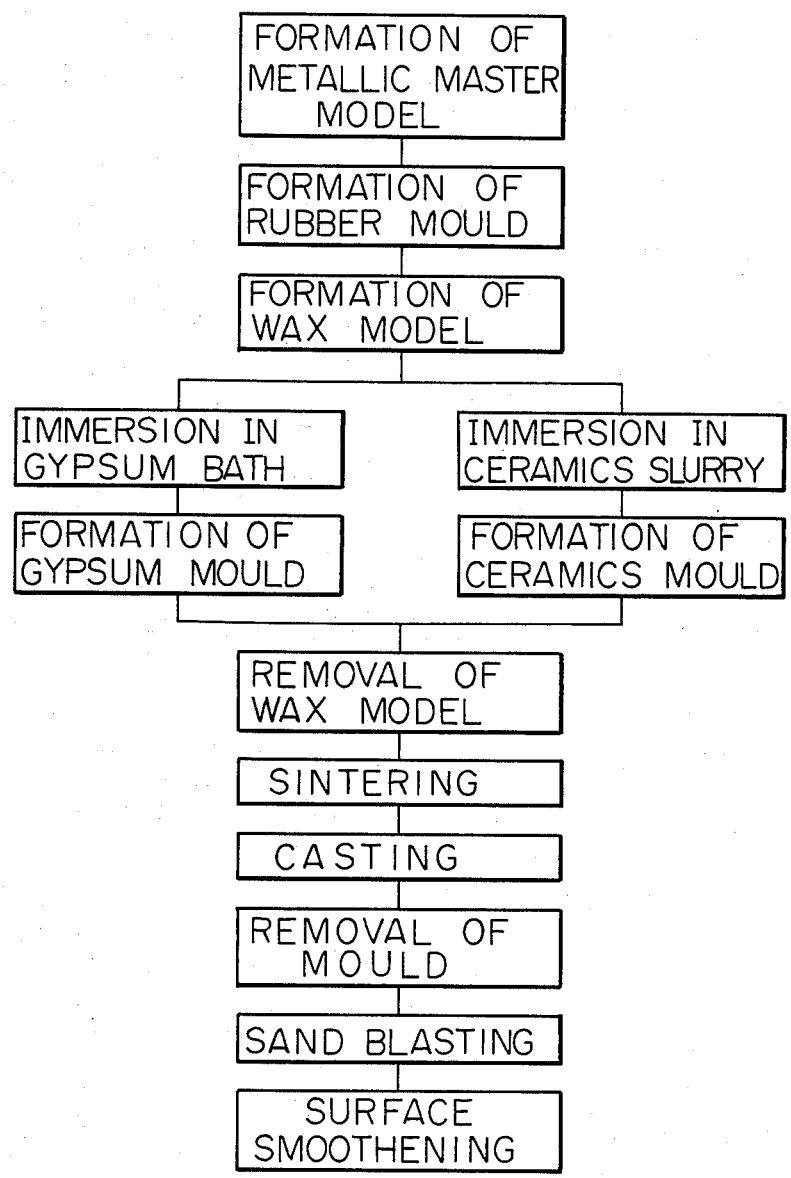
FIG. 4 is a flow chart showing one embodiment of the metal casting advantageously employed in the method of the present invention.

In forming of pad holders in accordance with the present invention, the metal casting process shown in flow diagram form in FIG. 4 is advantageously used.

In the metal casting illustrated, a metallic master model is first prepared. This master model is patterned after an eyeglass-frame under contemplation in which straight pad holders extend monolithically from facing edges of the rims. This master model is then covered with rubber which is then hardened in order to obtain a rubber female mold. After separation from the metallic master model, wax is injected into the rubber female mold in order to obtain a wax model after hardening.

Next, the wax model is immersed in a bath of a heat-resisting material. When a low melting point metal is used for the eyeglass-frame, the wax model is immersed in a gypsum bath in order to obtain a gypsum female mold after removal of the wax model by heating. When a high melting point metal is used for the eyeglass-frame, the wax model is immersed in a ceramics slurry and sand coating is applied in order to obtain a ceramics female mold after removal of the wax model. Preferably, the heat-resisting mold is subjected to sintering.

Using the heat-resisting mold so prepared, the metal casting is carried out by injecting molten alloy into the mold. The alloy may be a Cu-based alloy including 64% by weight of Cu with 18% by weight of Zn and 18% by weight of Ni, an Al-base alloy including 95% by weight of Al with 5% by weight of Mg, or a Ag-base alloy including 89% by weight of Ag with 10% by weight of Cu and 1% by weight of Be.

Figure 2:
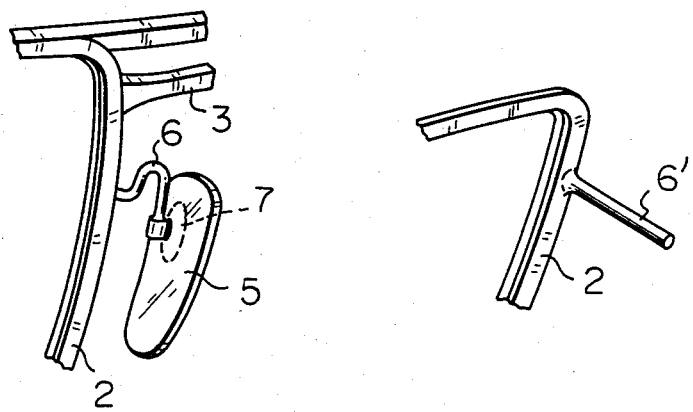
FIG. 2 is an enlarged perspective view of a pad holder conventionally used for the eyeglass-frame shown in FIG. 1.
Figure 3:
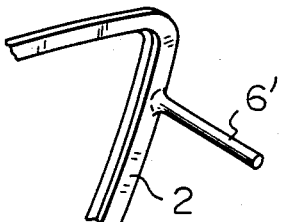
FIG. 3 is an enlarged perspective view of a pad holder manufactured in accordance with the present invention.

After the mold is removed by destruction, the cast product is subjected to sand blasting and surface smoothening in order to have a configuration shown in FIG. 3, in which a straight pad holder projects monolithically from the edge of the associated rim of the eyeglass-frame. Finally, the pad holder is subjected to bending in order to obtain a curved configuration such as shown in FIG. 2.

In one practical example of the method in accordance with the present invention, removal of the wax model is carried out by heating the heat-resisting mold at 240° C.

for about 30 minutes when the wax melts at 180° C. At sintering of the ceramics mold, heating temperature is raised at a speed of 200° C./Hr and heating is carried out at 700° C. for 2 hours. When the Cu-Zn—Ni alloy is used, the metal casting is carried out at 1050° C. Removal of the mold is carried out by water immersion about 10 minutes after the casting is over. Ceramics remaining on the surface of the cast product is removed by sand blasting. Surface smoothening is preferably carried out by application of chromium dioxide to the surface of the cast product.

The diameter of the pad holder should preferably be in a range from 0.6 to 1.0 mm. By properly designing the shape of the mold, a wide variety of configurations can be obtained for the pad holder. Its diameter may vary along the length. If desired, some decorative patterns may be formed on the surface of the pad holder.

In addition to the pad holders, bridges and lugs may be formed in one body with the rims of the eyeglass-frame in the method of the present invention.

In accordance with the present invention, monolithic formation of pad holders with rims removes the conventional need for brazing operation which requires highly skilled technique with complicated operational steps. Absence of any brazed parts greatly improves durability of eyeglass-frames against sweat corrosion. Further, use of the casting process assures wide freedom in designing of eyeglass-frames.

We claim:

1. An improved method for manufacturing an eyeglass-frame comprising the steps of:

forming a metallic master model patterned after an eyeglass-frame and having a straight pad holder extending from an associated rim;

covering said metallic master model with molten rubber in order to form a rubber female mold by separating said rubber from said metallic master model after said rubber has hardened;

injecting molten wax into said rubber female mold in order to form a wax model by separating said wax from said rubber mold after said wax has hardened;

immersing said wax model in a bath of heat-resistant material in order to form a heat-resistant material female mold;

removing said wax model from said heat-resistant material female mold by heating;

casting molten alloy into said heat-resistant material female mold to form a cast alloy having a straight section extending monolithically from a rim section;

removing said cast alloy from said heat-resistant material female mold; and bending said straight section to a required pad holder configuration.

2. An improved method as claimed in claim 1, in which said heat-resistant material is gypsum; and
said molten alloy is a low melting point alloy.

3. An improved method as claimed in claim 1, in which said heat-resistant material is a ceramic; and
said molten alloy is a high melting point alloy.

4. An improved method as claimed in claim 1, in which said heat-resistant material mold is subjected to sintering before casting.

* * * * *